Oct. 7, 1958 — E. W. GRANT — 2,855,495
TEMPERATURE CONTROL DEVICE
Filed Sept. 20, 1954 — 2 Sheets-Sheet 1

INVENTOR.
EARL W. GRANT
BY Philip Subkow
ATTORNEY.

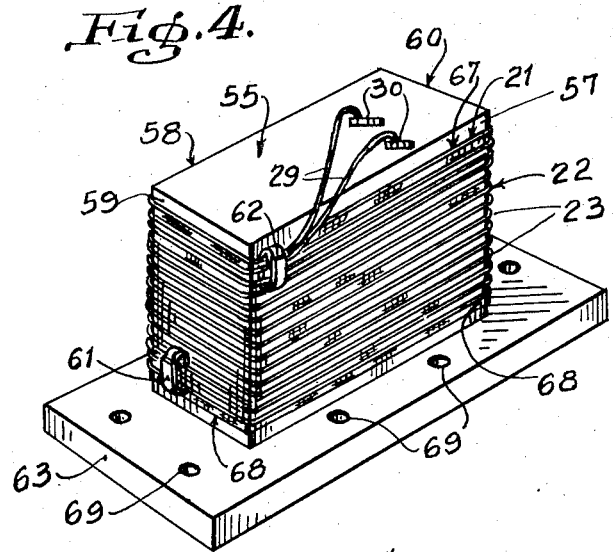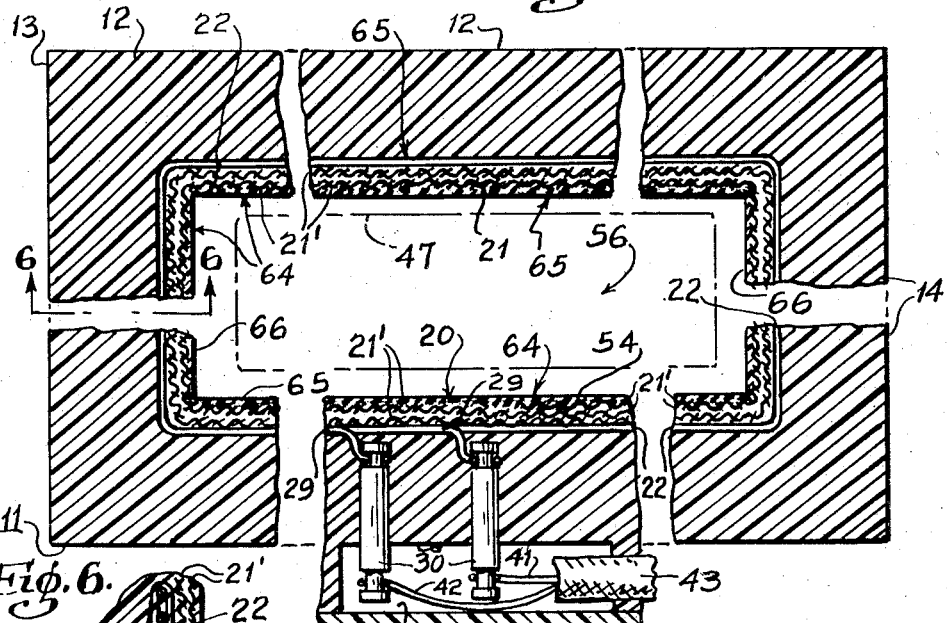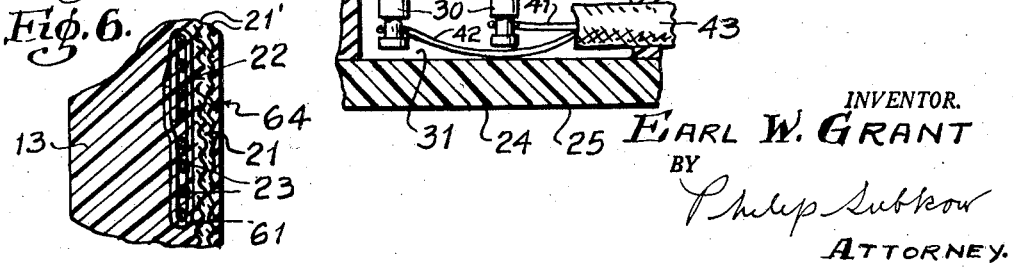

2,855,495
TEMPERATURE CONTROL DEVICE

Earl W. Grant, Los Angeles, Calif., assignor to Statham Instruments, Inc., a corporation of California Application September 20, 1954, Serial No. 457,191

7 Claims. (Cl. 219—35)

This invention relates to a temperature control device especially adapted for transducers, and is particularly concerned with a novel heater jacket in which a transducer may be positioned for testing same and/or maintaining the transducer at a uniform temperature.

It is known that sensitive instruments such as transducers are subject to variations in response due to ambient temperature changes. Hence, it is an object of this invention to design a device in which these sensitive instruments may be placed, in order to cancel out any errors introduced therein due to surrounding temperature fluctuations.

Another object is the provision of a heater jacket for a transducer, in which jacket the temperature can be raised and/or readily controlled to produce substantially uniform ambient temperature conditions, or temperatures which may vary only within a small preselected temperature range.

Yet another object is to provide a heater insulating jacket for a transducer, which is of simple design, is easily fabricated and which is dependable and durable.

These and other objects and advantages will be apparent from the following description of the invention:

The invention device is in the form of a case having a non-conductive wall in which is embedded a non-inductive electrical winding to prevent the creation of magnetic fields which may affect the functioning or response of the instruments to be placed within the case. The case is preferably constructed of a synthetic plastic material. A fabric sleeve, preferably composed of layers of a fabric material, is embedded in the wall of the case closely adjacent the entire inner periphery of the wall, the plastic material of which the wall is constructed filling the interstices of the fabric sleeve. A bifilar electrical heater winding is wound about the outer surface of the sleeve and is also embedded in the wall. Terminals at the ends of the winding extend exteriorly of the case side wall.

A terminal housing, also preferably formed of a non-conductive material such as plastic is connected or molded to the side wall of the case, and the terminals of the winding protrude into such housing. A thermostat is preferably positioned in the terminal housing with electrical connections between the aforementioned terminals and the thermostat. A removable cover is provided for the case.

By first placing the heater winding about the fabric sheet or sleeve and then embedding both the winding and sleeve in a plastic material, the heater winding is easily incorporated into the wall of the case with the wire in fixed position and efficiently insulated between the plastic material and the fabric sleeve. This also permits use of a bare metal heater wire, if desired, because the plastic fixes the wire in position, preventing the turns thereof from contacting each other and causing short circuiting. Further, the heater winding is positioned close to the surface of the inner wall and hence heating of the inside of the case takes place rapidly when the current in the winding is increased for this purpose, and when the selected temperature for the inside of the case is reached, such temperature can be maintained substantially uniform thereafter. Moreover, the provision of the terminal housing preferably also containing the thermostat makes for a compact neat assembly.

The invention is described in greater detail below in connection with the accompanying drawings wherein:

Fig. 4 is a perspective view of the heater winding positioned about the fabric sleeve which in turn is wound about the mandrel used in fabricating the heater jacket;

Fig. 5 is a horizontal section taken on line 5—5 of Fig. 3;

Fig. 6 is a partial vertical section taken on line 6—6 of Fig. 5;

Figure 1:
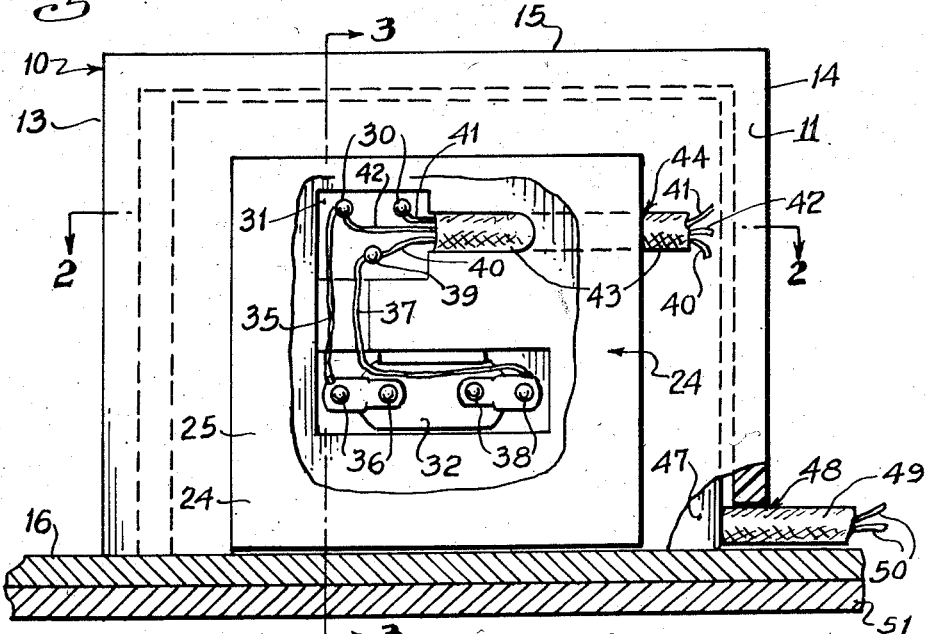
Fig. 1 is an elevation of the invention device partly in section, with the terminal housing broken away to show the structure thereof.
Figure 2:
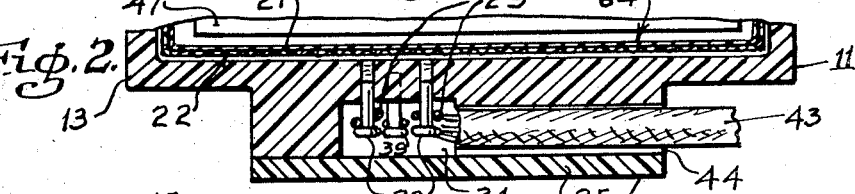
Fig. 2 is a partial horizontal section taken on line 2—2 of Fig. 1.

Numeral 10 represents the heater jacket, which is shown in the drawings as a case which is oblong in shape and has side walls 11 and 12, end walls 13 and 14, a top 15 and a removable bottom closure member 16. The heater jacket or case, however, may be of any other desired shape and may, for example, have an oval or circular cross section instead of rectangular, as shown in the drawings.

Embedded in the walls of the heater jacket 10 closely adjacent the entire inner periphery 20 thereof, i. e., the inner surface of side walls 11 and 12, and end walls 13 and 14, is a fabric sleeve 21 composed of a plurality of (shown in Fig. 5 as two) layers 21' of a non-conductive fabric material. Wound about the fabric sleeve 21 and in contact with the outer surface thereof is a bifilar electrical heater winding 22 composed of a number of turns of wire 23. The use of a bifilar or non-inductive heater winding is preferred in order to prevent the creation of magnetic fields which might tend to affect the operation of the instrument, e. g., transducer, placed within the heater jacket.

A housing cover 25 is secured by adhesive or other suitable means to a lower portion 26 of wall 11 and to a flange 28 in the upper portion of side wall 11 of the case. Wall 11 is built up in thickness in its lower portion 26 and at an intermediate portion 27, a cavity 28' being formed therein between portions 26 and 27. Positioned in cavity 28' is a thermostat element 32 which may be of any conventional type such as a bimetallic element. The ends 29 of the winding 22 are connected to terminals 30 positioned in wall 11, which terminals extend through the wall 11 into a space 31. It is seen that cover member 25 and the adjacent associated structure on the wall 11 of the case form a housing 24 for terminals 30, the thermostat 32, and the electrical leads described below, such housing being defined by cover 25, flange 28, wall 11 and the wall portions 26 and 27.

A series circuit is arranged between thermostat 32 and the heater winding 22 by connecting a wire 35 between one of terminals 36 of the thermostat and one of terminals 30, connecting a wire 37 between one of the other terminals 38 of the thermostat to a terminal 39 to which is attached an electrical lead 40, and by connecting a wire 41 to the other terminal 30 of the winding 22, leads 40 and 41 being connected to an outside source of current. Another wire 42 is connected to one of the terminals 30, wires 40, 41 and 42 being sheathed in a conduit 43 passing through an aperture 44 in the side of housing 24. Wires 41 and 42 form a series circuit with the heater winding 22 for determining whether any current is flowing through the heater winding 22, e. g. by connecting the external ends of these wires to any suitable measuring instrument such as a voltmeter or ammeter.

Bottom 16 is in the form of a removable cover which is fastened to the lower ends of side walls 11 and 12 by means of screws 45, the heads of which are disposed in recesses 46 formed in the lower surface of member 16. In using the device, an instrument such as a transducer 47 is positioned on member 16, the case or heater jacket 10 properly positioned thereover, and the screws 45 screwed into place. An aperture 48 is provided in the lower end of the case for receiving the cable 49 containing the electrical leads 50 for operation of the transducer or other instrument. If desired, a base plate 51 may be secured to member 16 by suitable means such as bolts (not shown) for purposes of attaching the device including the transducer contained therein to a supporting member, as for example, of a vehicle, wherein the transducer may function as an accelerometer used to measure the acceleration of the vehicle or as a pressure recording instrument, or the like.

To construct the heater jacket shown in Figs. 1, 2, 3 and 5 of the drawings, a strip of nonconductive fabric 21 of any suitable material such as broadcloth is looped into two layers 21'. The ends of the fabric loop are made to overlap as at 54 (Fig. 5), and such ends are cemented together. Sleeve 21 is then slipped over a mandrel 55 (see Fig. 4) having an oblong shape corresponding to that of the oblong space 56 to be formed in the interior of the heating jacket and in which the instrument or transducer 47 is positioned. In other words, side walls 57 and 58, and end walls 59 and 60 of mandrel 55 form the inside surfaces 65 of side walls 11 and 12, and the inside surfaces 66 of end walls 13 and 14, respectively of the heater jacket 10. The sleeve 21 is positioned about mandrel 55 so that about an equal amount of the mandrel protrudes above and below the upper and lower edges 67 and 68, respectively, of the sleeve. A bare bifilar electrical heater winding 22 is then wound tightly about the sleeve 21. A strip of plastic material 61 is wound about a number of the lower turns of wire 23, strip 61 acting as a clamp to hold theses wires and the end thereof in position while the remaining turns of wire 23 are made around the sleeve 21 and mandrel 55. The upper turns of wire 23 are likewise held in position by means of a second strip of plastic 62 wound about such upper wires. To the ends 29 of the winding 22 are connected the terminals 30. Care should be exercised in winding the turns of wire 23 about the sleeve 21 so that the adjacent wires in the winding 22 are free from contact with each other.

Figures 3, 7, 8:
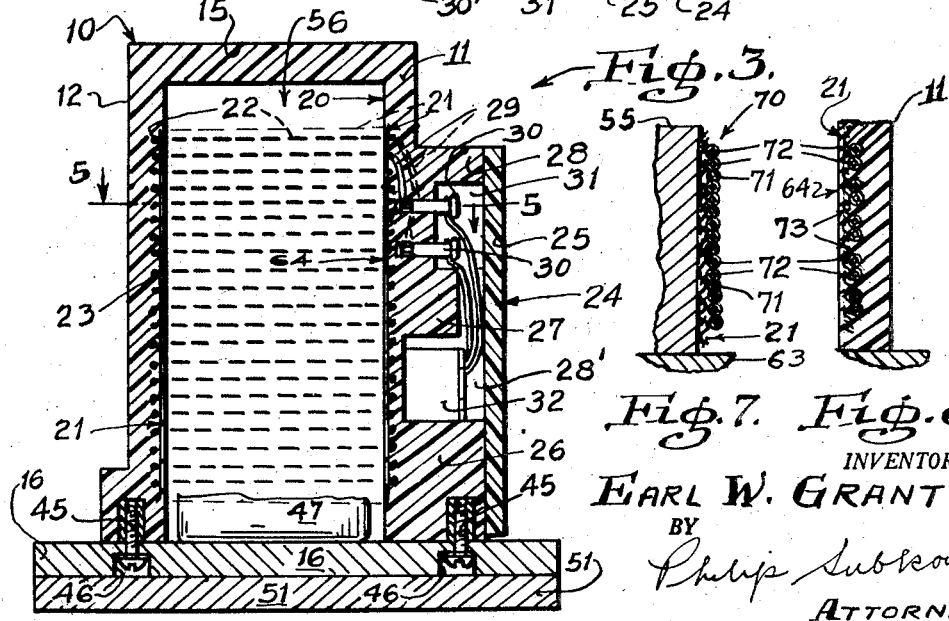
Fig. 3 is a vertical section taken on line 3—3 of Fig. 1.
Fig. 7 is a fragmentary cross section of the mandrel wall having a modified form of heater winding thereon.
Fig. 8 is a fragmentary cross section of the wall of a heater jacket containing the heater winding of Fig. 7.

A mold (not shown) corresponding to the outer contour of the heater jacket 10 is then positioned over mandrel 55 and connected to the base 63 thereof by means of bolts or other fasteners passing through apertures 69 of base 63, the terminals 30 being positioned in suitable inserts in the mold so that the terminals will be located in wall 11 of the jacket with the ends of the terminals extending into terminal housing 24, as shown in Fig. 3, after the jacket has been molded. A resin, preferably containing glass fibers distributed therethrough to enhance the strength and insulation properties of the heater jacket, is poured in liquid form into the mold through openings provided therein. Any suitable resin may be employed, e. g. thermosetting or thermoplastic materials, or mixtures thereof. Pressure is applied to the resin within the mold to fill all the crevices in the mold and to force the resin through the interstices of the fabric sleeve 21. When the plastic material has set, the mold and mandrel are removed, leaving the molded heater jacket including side walls 11 and 12, end walls 13 and 14 and top 15 thereof, housing cover 25 being thereafter secured to wall 11 in the manner described above.

It will be noted that on application of the resinous molding material under pressure, the resin not only penetrates the interstices of the fabric sleeve 21, but passes around the top and bottom edges of the fabric on mandrel 55, to form a thin inner wall 64 (see Figs. 5 and 6) between the inner periphery 20 of the jacket and the fabric sleeve 21, so that said sleeve is substantially completely and immovably embedded in the plastic walls of the heater jacket, as is also the bifilar electrical winding 22. The plastic strips or clamps 61 and 62 also become embedded in the plastic material from which the heater jacket walls are formed.

In a preferred embodiment referring to Figs. 7 and 8, a bifilar winding 70 is employed, such winding being insulated. In this modification the end of the bifilar winding 70 and the end of another wire 71 are anchored adjacent the lower edge of sleeve 21 positioned on mandrel 55, e. g. by use of a plastic strip similar to 61, and the bifilar winding 70, with the wires 72 of each loop thereof touching each other, and wire 71, positioned adjacent to and in contact with one of such wires 72, are wound tightly about sleeve 21 in the manner indicated in Fig. 7. The opposite end of the bifilar winding is then anchored in position by means of a second clamp member such as plastic strip 62 shown in Fig. 4, and the auxiliary wire 71 is then unwound and clipped adjacent its point of attachment to the anchoring means such as plastic strip 61 at the lower end of sleeve 21. Removal of wire 71 leaves a space 73 between each loop of the bifilar winding consisting of the two closely adjacent wires 72. The provision of spaces 73 permits plastic to flow therein and substantially entirely around each loop of the bifilar winding 70 to securely bind each such loop in place in the plastic walls of the heater jacket, as seen in Fig. 8.

In accordance with this latter embodiment, it is seen that the heater wire may be readily wound about the sleeve 21 and mandrel 55 without requiring the high degree of care necessary where the heater wire is a bare metal wire. Further, by use of the auxiliary wire 71 for winding purposes, so as to leave a space between adjacent loops of the bifilar winding sufficient to permit flow of plastic therein, the bifilar winding is securely locked in the heater jacket wall.

If desired, thermostat 32 can be eliminated completely, or positioned outside the heater jacket 10.

While I have described a particular embodiment of my invention for the purpose of illustration, it should be understood that various modifications and adaptations thereof may be made within the spirit of the invention as set forth in the appended claims.

I claim:

1. A heater jacket which comprises a hollow case having an electrically non-conductive plastic wall defining the entire inner periphery of said case, a cover for said case, a fabric sleeve positioned in said wall closely adjacent the inner periphery thereof, said plastic filling the interstices of said fabric sleeve, an insulated bifilar electrical heater winding positioned about and in contact with said sleeve, said winding being separate from said sleeve and embedded in said wall, and terminals at the ends of said winding and extending exteriorly of said wall for supplying an electrical current to said winding.

2. A heater jacket which comprises a hollow case having an electrically non-conductive plastic wall defining the entire inner periphery of said case, a fabric sleeve formed of a plurality of layers of a fabric material embedded in the side wall of said case closely adjacent the inner periphery of said wall, an insulated bifilar electrical heater winding positioned about and in contact with said sleeve, the adjacent loops of said winding being spaced from each other, said winding being separate from said sleeve and embedded in said plastic wall with plastic disposed in the spaces between said adjacent loops, a housing connected to said case, terminals at the ends of said winding and extending exteriorly of said wall and into said housing, a thermostat positioned in said housing, and electrical connections between said terminals and said thermostat.

3. A heater jacket for controlling the ambient temperature about a transducer, which comprises a hollow plastic case, a removable cover for said case, a fabric sleeve formed of a plurality of layers of a fabric material embedded in the side wall of said case closely adjacent the entire inner periphery of said wall, said plastic filling the interstices of said fabric sleeve, a bifilar electrical heater winding surrounding and in contact with the outer surface of said sleeve, said winding being separate from said sleeve and embedded in said wall, and terminals at the ends of said winding and extending exteriorly of said wall for supplying an electrical current to said winding.

4. A heater jacket for controlling the ambient temperature about a transducer, which comprises a hollow plastic case, a removable cover for said case, a fabric sleeve formed of a plurality of layers of a fabric material embedded in the side wall of said case closely adjacent the entire inner periphery of said wall, said plastic filling the interstices of said fabric sleeve, a bifilar electrical heater winding surrounding and in contact with the outer surface of said sleeve, said winding being separate from said sleeve and embedded in said wall, a non-conductive terminal housing connected to said side wall, terminals at the ends of said winding and extending exteriorly of said wall and into said housing, a thermostat positioned in said housing, and electrical connections between said terminals and said thermostat.

5. A heater jacket which comprises a hollow case having an electrically non-conductive wall defining the entire inner periphery of said case, said wall being composed of a resin, a fabric sleeve positioned in said wall closely adjacent the inner periphery thereof, said resin filling the interstices of said fabric sleeve, a bifilar electrical heater winding positioned about and in contact with said sleeve, said winding being separate from said sleeve and embedded in said wall, and terminals at the ends of said winding and extending exteriorly of said wall for supplying an electrical current to said winding.

6. A heater jacket which comprises a hollow case having an electrically non-conductive wall defining the entire inner periphery of said case, said wall being composed of a resin, a fabric sleeve positioned in said wall closely adjacent the inner periphery thereof, said resin filling the interstices of said fabric sleeve, a non-inductive electrical heater winding positioned about and in contact with said sleeve, said winding being separate from said sleeve and embedded in said wall, and terminals at the ends of said winding and extending exteriorly of said wall for supplying an electrical current to said winding.

7. A heater jacket which comprises a hollow case having an electrically non-conductive outer wall, said wall being composed of a resin, a fabric sleeve positioned in said wall closely adjacent the inner periphery thereof, a non-inductive electrical heater winding positioned about and in contact with said sleeve, said winding being separate from said sleeve and embedded in said outer wall, a thin inner wall of resin between the inner periphery of said case and said sleeve, the inner surface of said wall defining the entire inner periphery of said case, and terminals at the ends of said winding and extending exteriorly of said outer wall for supplying an electrical current to said winding.

References Cited in the file of this patent

UNITED STATES PATENTS

| Number | Name | Date |
|---|---|---|
| Re. 14,730 | Maves | Sept. 30, 1919 |
| 1,782,218 | Suter | Nov. 18, 1930 |
| 1,786,439 | Maxson | Dec. 30, 1930 |
| 1,834,353 | Shoudy | Dec. 1, 1931 |
| 1,870,968 | Sinden | Aug. 9, 1932 |
| 1,972,499 | Tarpley | Sept. 4, 1934 |
| 2,036,368 | Siegel et al. | Apr. 7, 1936 |
| 2,048,929 | Garman | July 28, 1936 |
| 2,151,319 | Finch | Mar. 21, 1939 |
| 2,393,100 | Gallay | Jan. 15, 1946 |
| 2,500,305 | Ackley | Mar. 14, 1950 |
| 2,516,637 | McCollum | July 25, 1950 |
| 2,518,225 | Dorst | Aug. 8, 1950 |
| 2,524,886 | Colander | Oct. 10, 1950 |
| 2,566,921 | Briscoe | Sept. 4, 1951 |
| 2,669,646 | Ford | Feb. 16, 1954 |